United States Patent
Tsuchiya et al.

(10) Patent No.: US 11,941,657 B2
(45) Date of Patent: Mar. 26, 2024

(54) INFORMATION PROCESSING SYSTEM, METHOD, AND MEDIUM

(71) Applicant: Rakuten Group, Inc., Tokyo (JP)

(72) Inventors: Tsuneo Tsuchiya, Tokyo (JP); Sachiko Fukushima, Tokyo (JP); Nanase Kato, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/360,588

(22) Filed: Jun. 28, 2021

(65) Prior Publication Data

US 2021/0406946 A1     Dec. 30, 2021

(30) Foreign Application Priority Data

Jun. 30, 2020  (JP) ................. 2020-112718

(51) Int. Cl.
  *G06Q 30/0207*   (2023.01)
  *G06Q 20/40*     (2012.01)

(52) U.S. Cl.
  CPC ..... *G06Q 30/0236* (2013.01); *G06Q 20/4014* (2013.01); *G06Q 30/0215* (2013.01)

(58) Field of Classification Search
  CPC .......... G06Q 30/0236; G06Q 20/4014; G06Q 30/0215
  USPC ...................................... 705/14.36
  See application file for complete search history.

(56) References Cited

U.S. PATENT DOCUMENTS

2020/0226553 A1*  7/2020  Wender ............ G06Q 10/06314

FOREIGN PATENT DOCUMENTS

| | | | | |
|---|---|---|---|---|
| CN | 105471847 B | * | 4/2019 | ......... H04L 63/0815 |
| JP | 2007058469 A | * | 3/2007 | |
| JP | 2020-17313 A | | 1/2020 | |

OTHER PUBLICATIONS

E-Verify, E-Verify User Manual for Corporate Administrators, 2017 (Year: 2017).*
Rakuten Group, Inc. 'Rakuten PointClub: Rakuten Point Guide', [retrieved on Jun. 21, 2020], Internet <URL: https://point.rakuten.co.jp/guidance/?l-id=point_header_guidance2> (3 pages total).
Rakuten Payment, Inc. 'Rakuten Pay—Easy payment on the town or on the Web! Use limited-time points!' [retrieved on Jun. 21, 2020], Internet <URL: https://pay.rakuten.co.jp/?l-id=header_nav_top> (15 pages total).

* cited by examiner

*Primary Examiner* — Tarek Elchanti
(74) *Attorney, Agent, or Firm* — Sughrue Mion, PLLC

(57) ABSTRACT

An information processing system includes an identification information receiving unit for receiving user identification information presented by a user, a determining unit for determining whether the user identification information that has been received is first user identification information for performing first processing relating to the user, or second user identification information for performing second processing that is executed following the first processing, and an user identifying unit for, in a case of determining that the user identification information that has been received is the second user identification information, identifying a user that is an object of third processing relating to the user, with the third processing being executed following the second processing, on the basis of the second user identification information.

13 Claims, 10 Drawing Sheets

FIG.8

| No. | USER IDENTIFICATION INFORMATION | SETTLEMENT DATE-AND-TIME | SETTLEMENT MONETARY AMOUNT |
|---|---|---|---|
| 1 | 1111 2323 4545 6767 | 2020.02.22 16:03 | 900 |
| 2 | 1212 0001 0234 0567 | 2020.02.22 18:10 | 1,000 |
| 3 | 1212 0002 6789 8765 | 2020.02.23 09:00 | 500 |
| | | | |

FIG.9

| No. | SETTLEMENT USER IDENTIFICATION INFORMATION | USER ID | SETTLEMENT DATE-AND-TIME | SETTLEMENT MONETARY AMOUNT |
| --- | --- | --- | --- | --- |
| 1 | 1212 0001 0234 0567 | XX101 | 2020.02.22 18:10 | 1,000 |
| 2 | 1212 0002 6789 8765 | XX234 | 2020.02.23 09:00 | 500 |
| | | | | |

INFORMATION PROCESSING SYSTEM, METHOD, AND MEDIUM

CROSS-REFERENCE TO RELATED APPLICATION(S)

This application claims priority to and the benefit of Japanese Patent Application No. 2020-112718, filed on Jun. 30, 2020, the disclosure of which is expressly incorporated herein by reference in its entirety for any purpose.

FIELD

The present disclosure relates to technology for identifying users by using user identification information, and providing services.

BACKGROUND

Conventionally, various types of systems using different types of user identification information in accordance with type of processing are in use.

SUMMARY

There conventionally exist various types of systems which are capable of executing a plurality of types of processing, and also which use different user identification information in accordance with types of processing. However, in such systems, user identification information differs for each type of processing even in cases of executing different types of processing in order for the same user, and accordingly, each time processing is performed, work is performed to request the user to present user identification information and to acquire the user identification information.

In view of the foregoing, it is an object of the present disclosure to reduce the troublesomeness of work of acquiring user identification information in a system which is capable of executing a plurality of types of processing, and also which uses different user identification information in accordance with types of processing.

An example of the present disclosure is an information processing system, including identification information receiving means for receiving user identification information presented by a user, determining means for determining whether the user identification information that has been received is first user identification information for performing first processing relating to the user, or second user identification information for performing second processing that is executed following the first processing, and user identifying means for, in a case of determining that the user identification information that has been received is the second user identification information, identifying a user that is an object of third processing relating to the user, with the third processing being executed following the second processing, on the basis of the second user identification information.

The present disclosure can be comprehended as being a method executed by an information processing device, a system, or a computer, or as a program executed by a computer. The present disclosure can also be comprehended as being an arrangement where such a program is recorded in a recording medium that is readable by a computer or some other device, machine, or the like. The term "recording medium that is readable by a computer or the like" as used here is a recording medium where information such as data, programs, and so forth, is accumulated by electrical, magnetic, optical, mechanical, or chemical action, and can be read by a computer or the like thereby.

According to the present disclosure, the troublesomeness of work of acquiring user identification information in a system that is capable of executing a plurality of types of processing, and also which uses different user identification information in accordance with types of processing, can be reduced.

BRIEF DESCRIPTION OF THE DRAWINGS

FIG. 8 is a diagram illustrating an overview of a point impartation file created in the embodiment;

FIG. 9 is a diagram illustrating an overview of data stored by a settlement user identification information storage unit (second storage unit) in the embodiment.

DESCRIPTION OF EMBODIMENTS

An embodiment of an information processing system, an information processing device, method, and program according to the present disclosure will be described below with reference to the Figures. Note however, that the description of the embodiment below has been made to exemplify the embodiment, and does not limit the information processing system, information processing device, method, and program according to the present disclosure to the specific configurations described below. In implementation, specific configurations are employed as appropriate in accordance with the form of implementation, and various alterations and modifications may also be made.

In the present embodiment, an arrangement where the information processing system, information processing device, method, and program according to the present disclosure have been carried out in a settlement system will be described. Note however, that the information processing system, information processing device, method, and program according to the present disclosure is capable of being broadly used in technology for providing users with services on the basis of user identification information, and the object of application of the present disclosure is not limited to the example shown in the embodiment.

System Configuration

Figure 1:
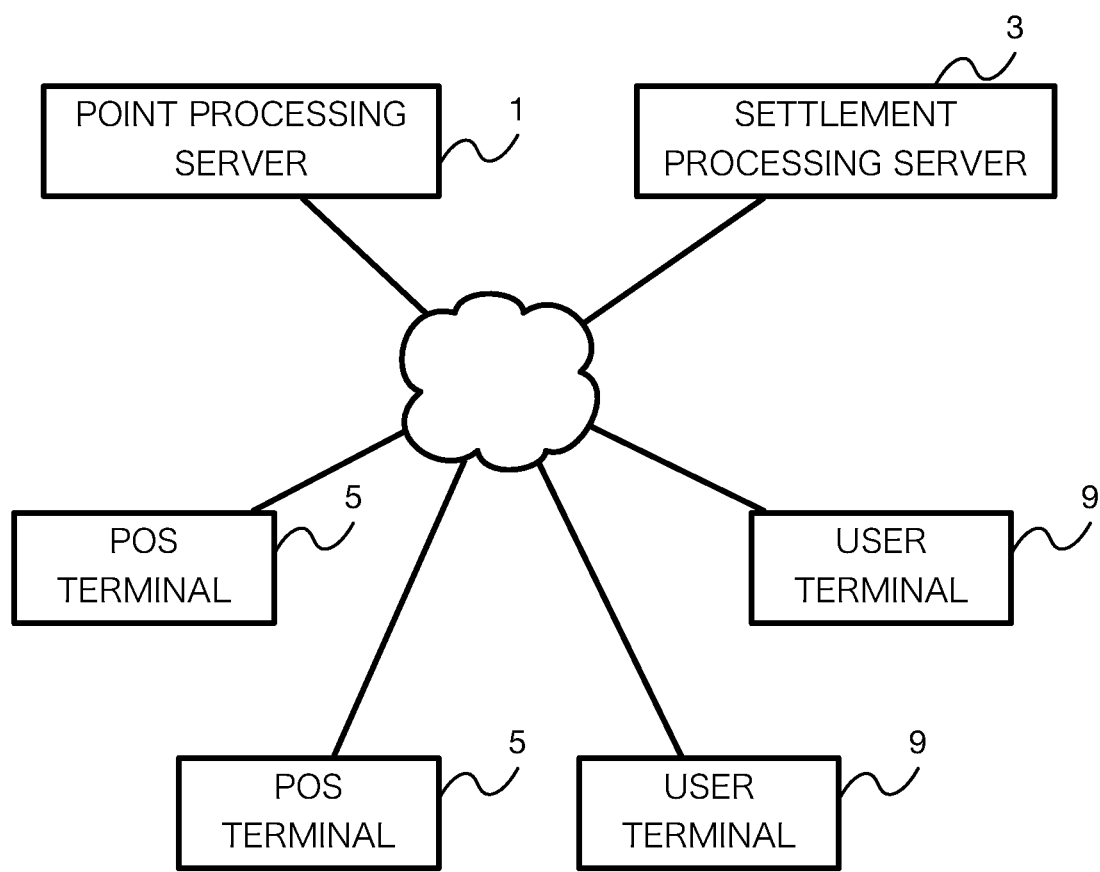
FIG. 1 is a schematic diagram illustrating a configuration of an information processing system according to an embodiment.

FIG. 1 is a schematic diagram illustrating a system configuration according to the present embodiment. The system according to the present embodiment is provided with a point processing server 1, a settlement processing server 3, one or a plurality of point of sales (POS) terminals 5, and one or a plurality of user terminals 9, which are capable of communication with each other, by being connected to a network. Note that while description is made in the present embodiment by way of an example of a configuration in which point processing and settlement processing are processed at different servers, configurations of networks and devices are not limited to exemplifications in the present embodiment. For example, point processing and settlement processing may be processed by a single server, or each of point processing and settlement processing may be processed being further distributed among a plurality of servers.

The system according to the present embodiment is a system that is capable of executing first processing, second processing, and third processing. In the present embodiment, the first processing is at least one of processing of acquiring a usable balance of a predetermined type of value associated with an account of a user, processing of notifying the usable balance of the value to a transmission source (a POS terminal in the present embodiment) of user identification information, and processing of applying the value to part or all of settlement, and is processed by a later-described first processing unit prior to second processing (settlement processing in the present embodiment) relating to the relevant user. Also, the second processing in the present embodiment is settlement processing performed for the user, and is processed by a later-described second processing unit. Also, the third processing in the present embodiment is processing of adding a balance of a predetermined value associated with the account of the user (point impartation processing in the present embodiment) in accordance with the monetary amount regarding which settlement is processed, and is executed by a later-described third processing unit following the second processing relating to the relevant user.

Note however, that the specific contents of the first processing, the second processing, and the third processing, described in the present embodiment, are an exemplification of a case of applying the technology according to the present disclosure, and are not limited to specific examples disclosed in the present embodiment. For example, the first processing may be discounting processing that does not use points (coupon code discounts or the like), and the second processing may be settlement processing using values (points, miles, etc.) other than common currencies. Further, the technology according to the present disclosure is applicable to various systems in which different user identification information is used in accordance with types of processing.

Figure 2:
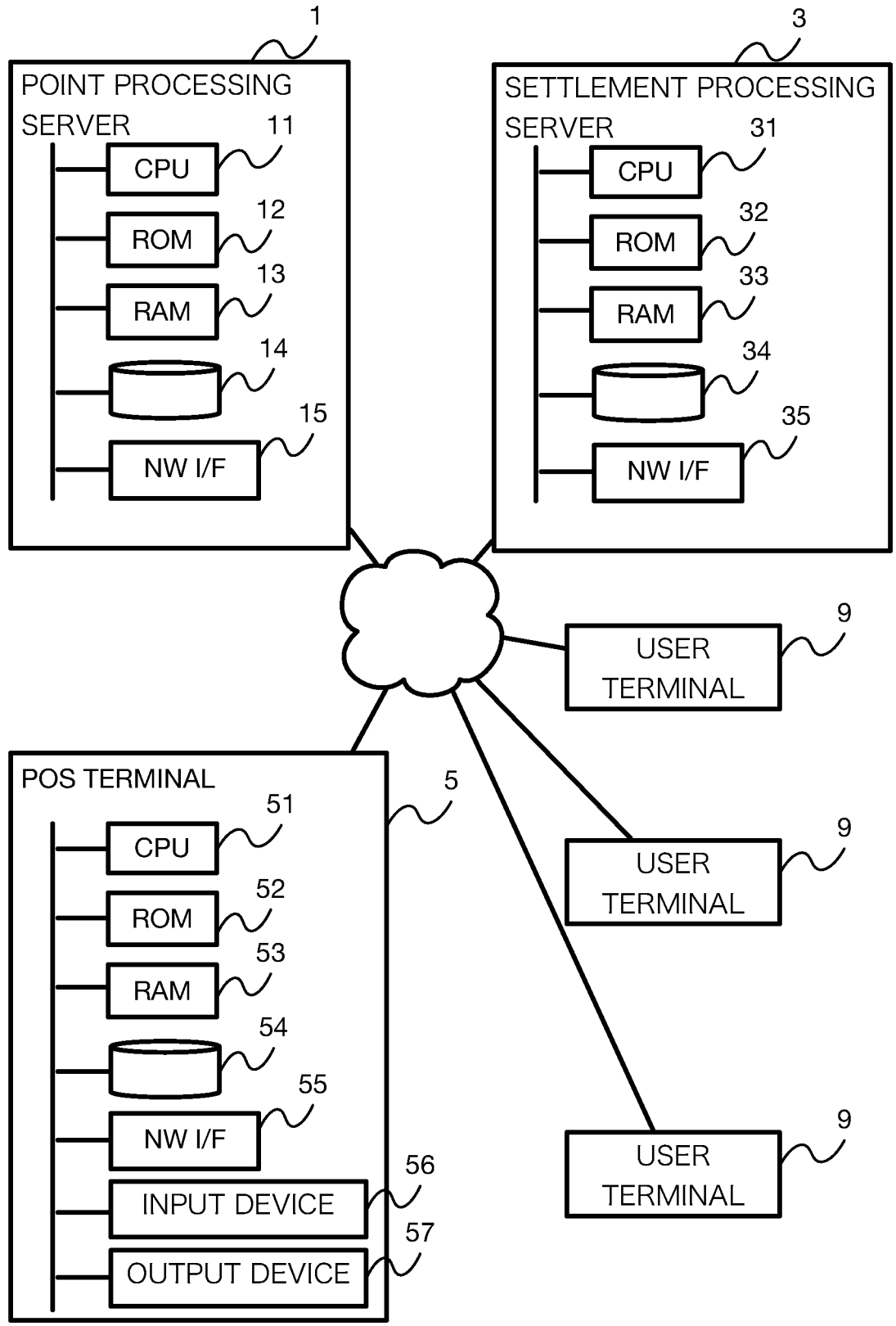
FIG. 2 is a diagram illustrating a schematic hardware configuration of the information processing system according to the embodiment.

FIG. 2 is a diagram illustrating a schematic hardware configuration of the system according to the present embodiment. The point processing server 1 is a server for providing users with point services. The point processing server 1 is a computer that is provided with a central processing unit (CPU) 11, read-only memory (ROM) 12, random access memory (RAM) 13, a storage device 14 such as electrically erasable and programmable read-only memory (EEPROM), a hard disk drive (HDD), or the like, a communication unit 15 such as a network interface card (NIC) or the like, and so forth. Note however, that specific hardware configurations of the point processing server 1 may be omitted, replaced, or added as appropriate in accordance with the form of implementation. Further, the point processing server 1 is not limited to a device with a single housing. The point processing server 1 may be realized by a plurality of devices, using technology of the so-called cloud or distributed computing, or the like.

The settlement processing server 3 is a server that provides users with settlement services. The settlement processing server 3 is a computer that is provided with a CPU 31, ROM 32, RAM 33, a storage device 34, a communication unit 35, and so forth, in the same way as the point processing server 1. Note however, that specific hardware configurations of the settlement processing server 3 may be omitted, replaced, or added as appropriate in accordance with the form of implementation. Further, the settlement processing server 3 is not limited to a device with a single housing. The settlement processing server 3 may be realized by a plurality of devices, using technology of the so-called cloud or distributed computing, or the like.

The POS terminal 5 is a terminal device that is placed in a location such as a shop or the like where users purchase products or services, and is used to perform settlement and so forth at the time of products/services being purchased. The POS terminal 5 is a computer that is provided with a CPU 51, ROM 52, RAM 53, a storage device 54, a communication unit 55, an input device 56, an output device 57, and so forth. As for the input device 56, the POS terminal 5 is provided with a device for reading user identification information, such as an optical code reader, a radio-frequency identification (RFID) reader, or the like, besides a keyboard or touch panel. Note however, that specific hardware configurations of the POS terminal 5 may be omitted, replaced, or added as appropriate in accordance with the form of implementation. For example, a so-called smartphone that has a touchscreen as an input/output device and that enables a user to install and execute desired applications may be used as the POS terminal 5 instead of a conventional POS register terminal, and the types of devices that can be used as the POS terminal 5 is not limited. Further, the POS terminal 5 is not limited to a device with a single housing. The POS terminal 5 may be realized by a plurality of devices, using technology of the so-called cloud or distributed computing, or the like.

The user terminal 9 is a terminal device used by a user. The user terminal 9 is a computer that is provided with a CPU, ROM, RAM, a storage device, a communication unit, an input device, an output device, and so forth (omitted from illustration). Also, the user terminal 9 is not limited to a device with a single housing. The user terminal 9 may be realized by a plurality of devices, using technology of the so-called cloud or distributed computing, or the like. The user uses various types of services provided by the point processing server 1 and the settlement processing server 3 via such user terminals 9.

Figure 3:
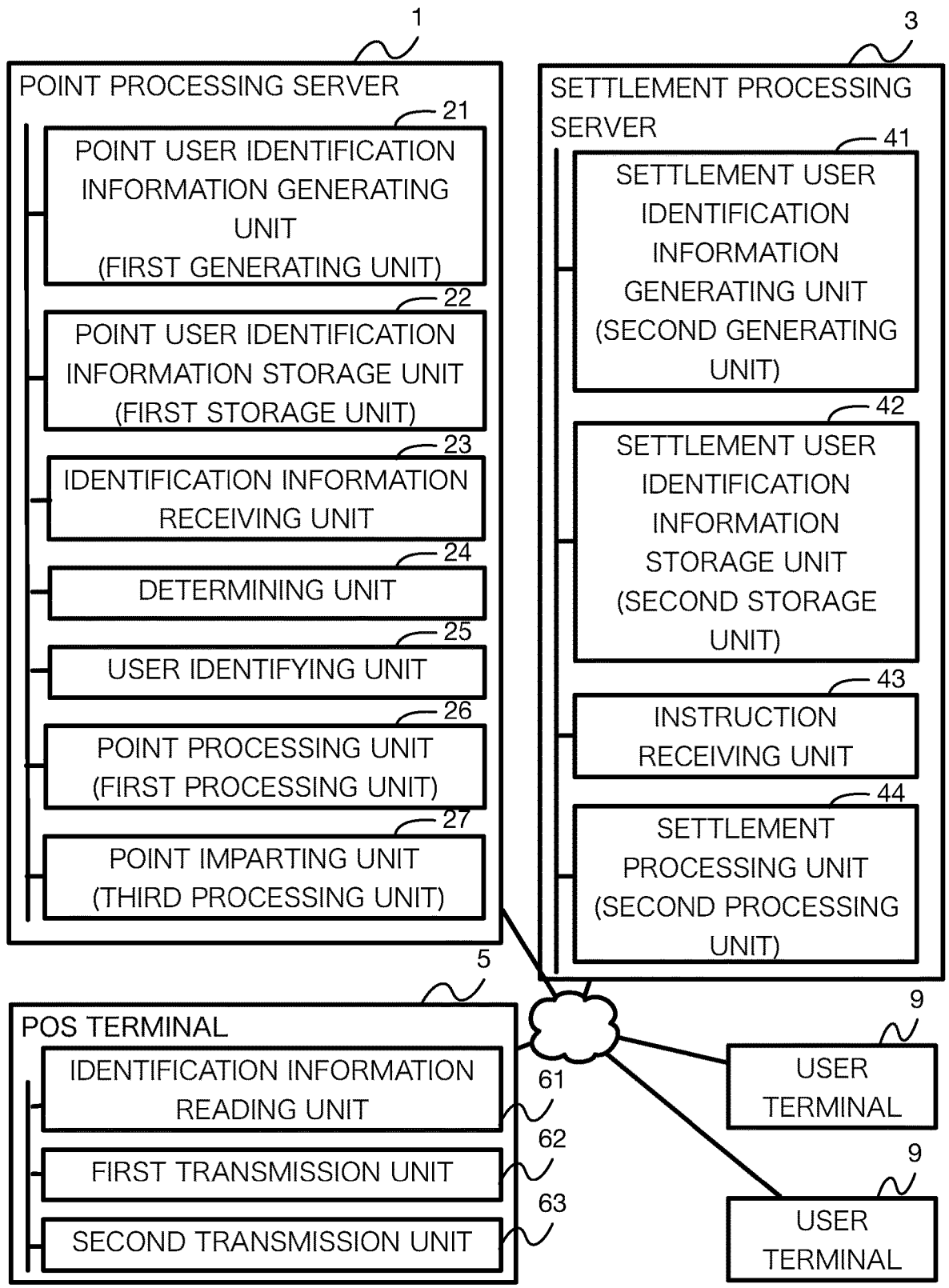
FIG. 3 is a diagram illustrating a schematic functional configuration of the information processing system according to the embodiment.
Figure 4:
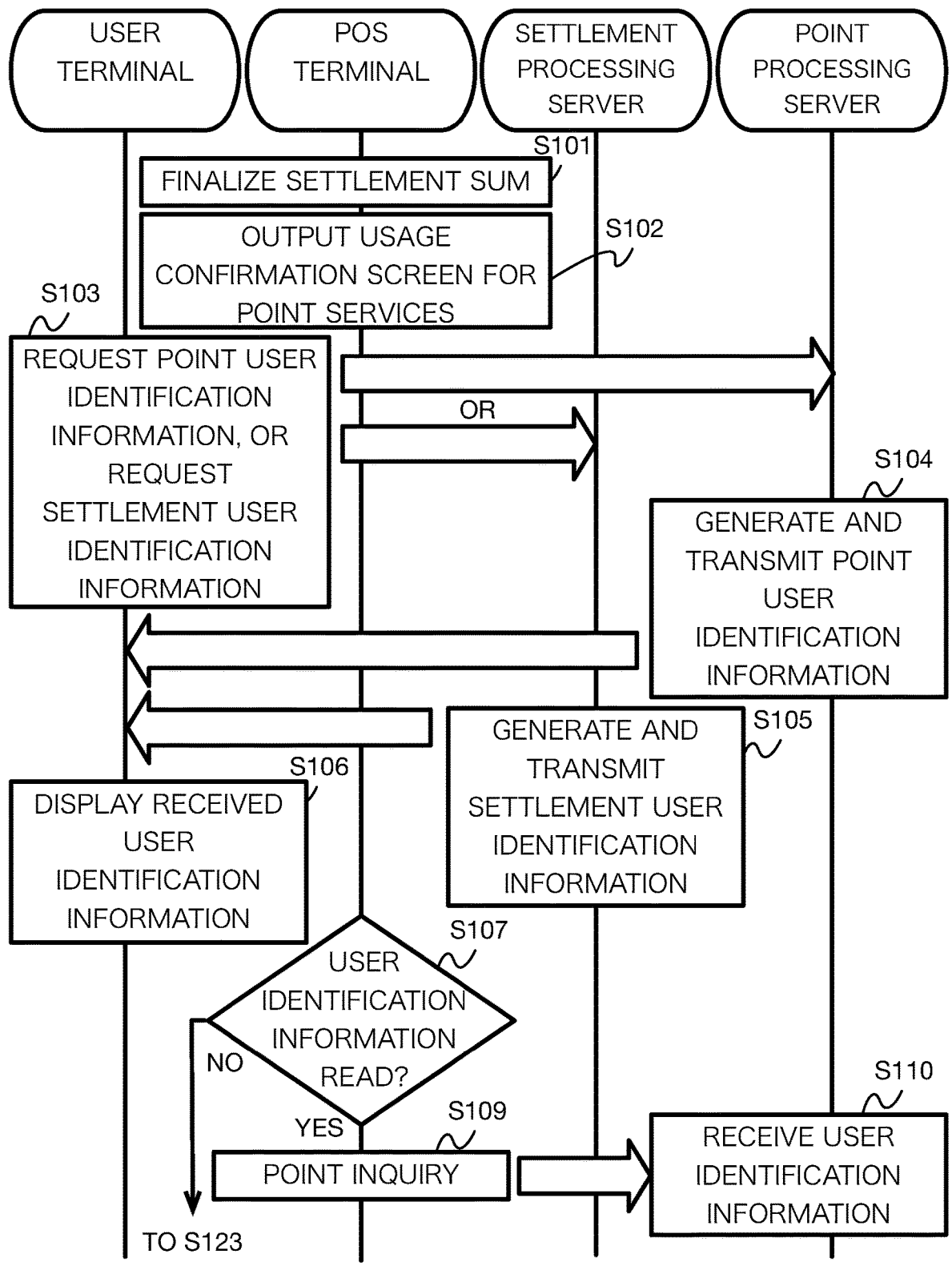
FIG. 4 is a flowchart and communication sequence (1) showing an overview of a settlement flow according to the embodiment.
Figure 5:
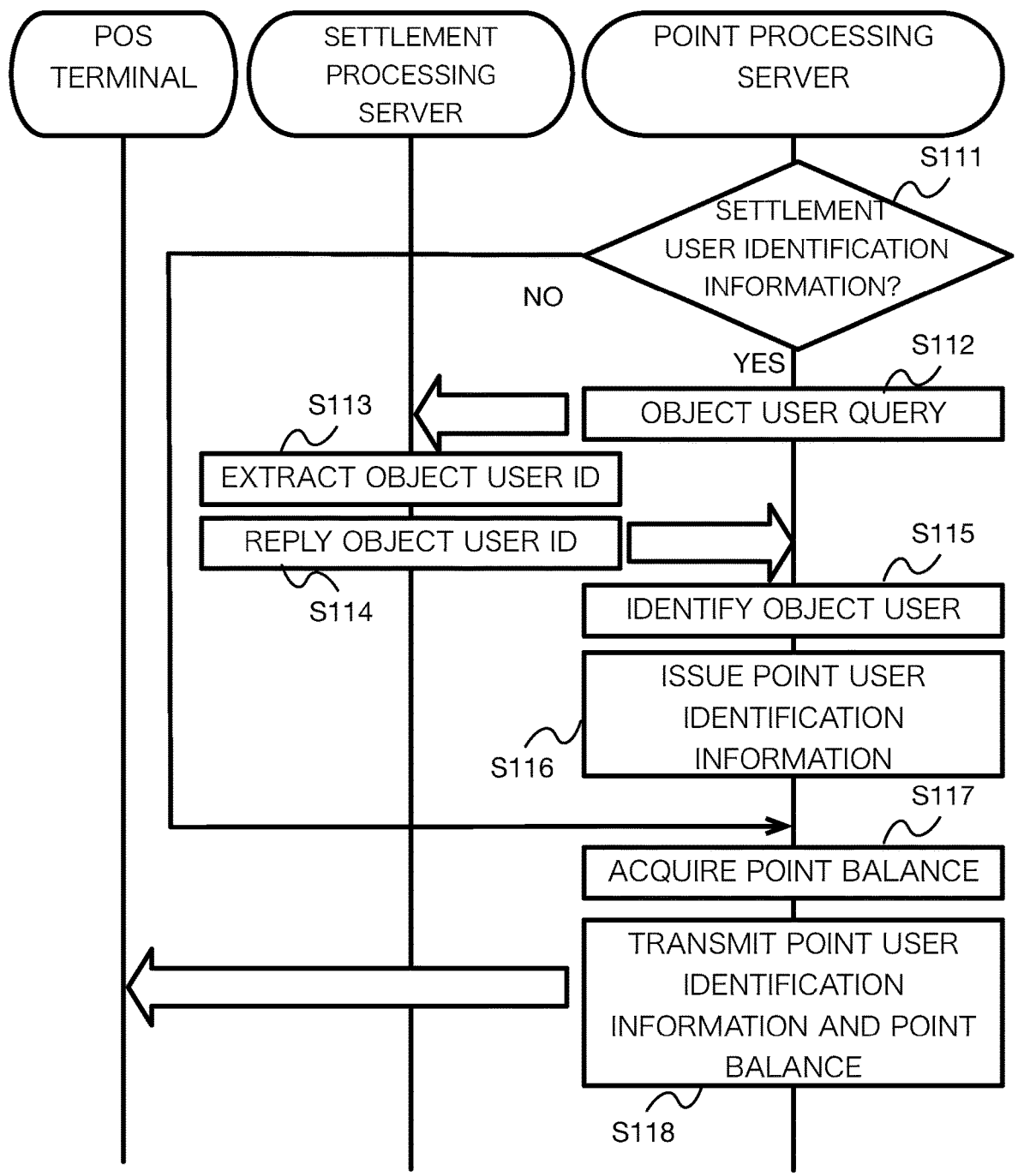
FIG. 5 is a flowchart and communication sequence (2) showing an overview of the settlement flow according to the embodiment.
Figure 6:
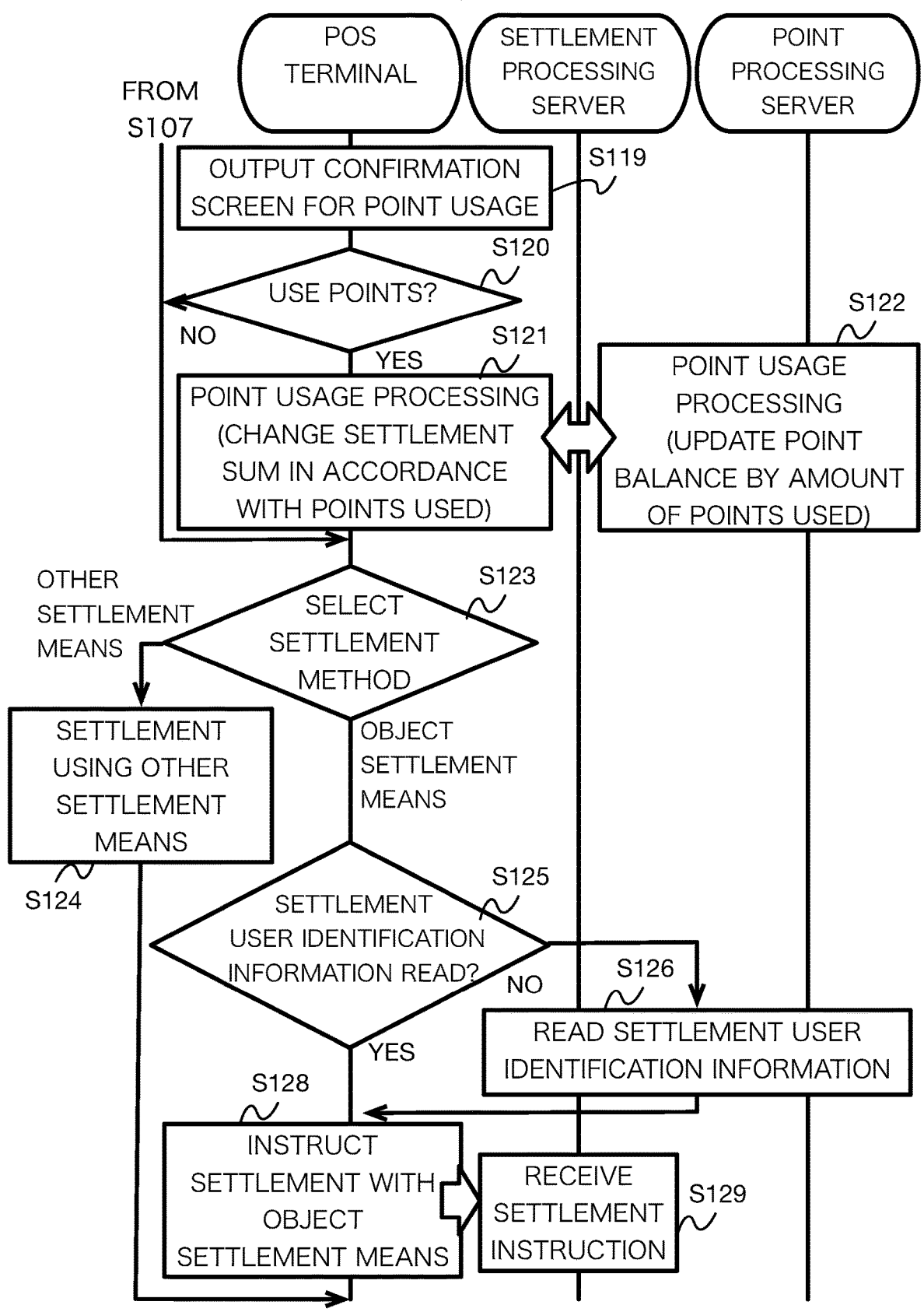
FIG. 6 is a flowchart and communication sequence (3) showing an overview of the settlement flow according to the embodiment.
Figure 7:
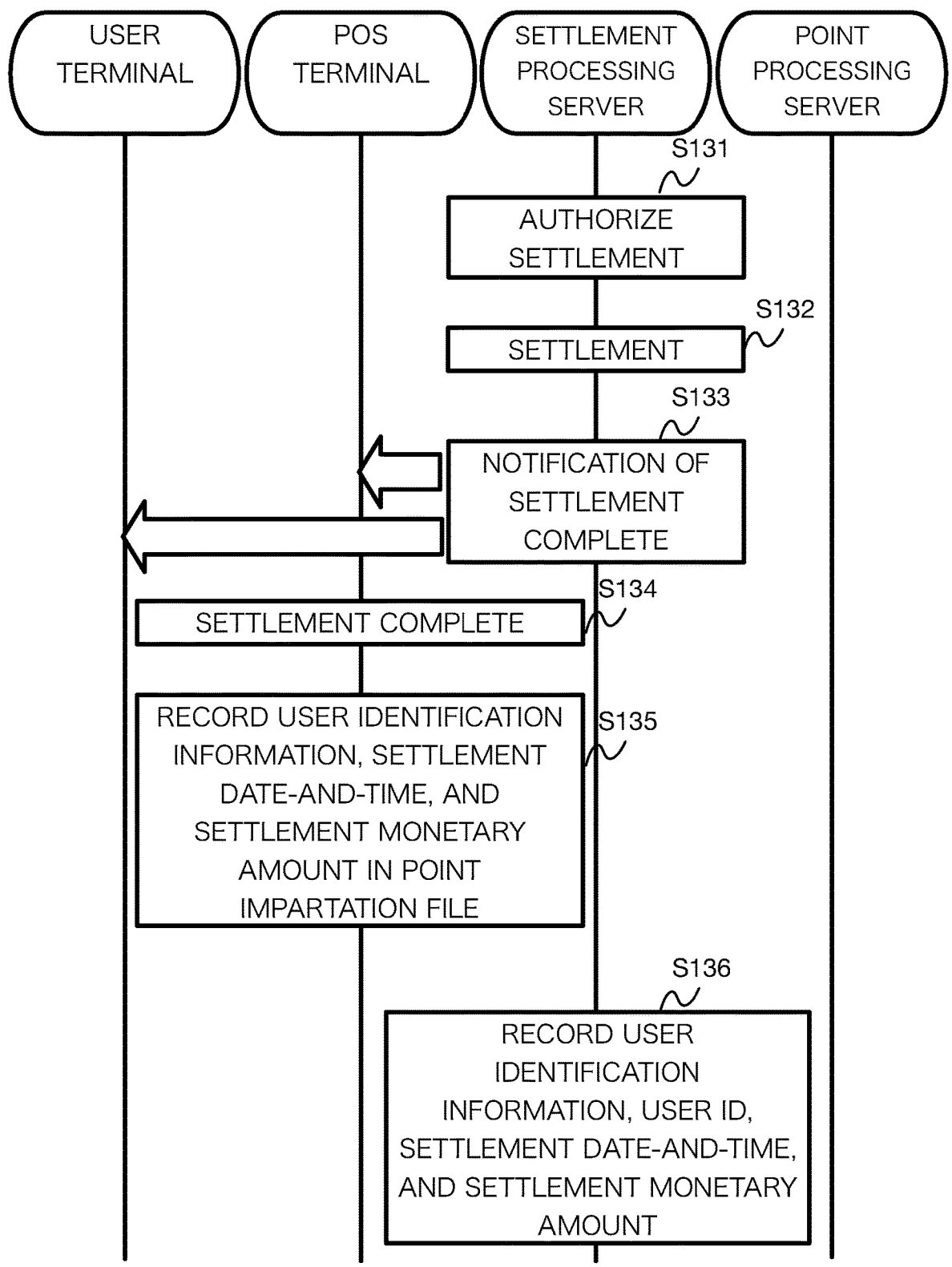
FIG. 7 is a flowchart and communication sequence (4) showing an overview of the settlement flow according to the embodiment.

FIG. 3 is a diagram illustrating a schematic functional configuration of the information processing system according to the present embodiment. The POS terminal 5 functions as an information processing device that is provided with an identification information reading unit 61, a first transmission unit 62, and a second transmission unit 63, by programs recorded in the storage device 54 being read to the RAM 53, and executed by the CPU 51, thereby controlling each of the pieces of hardware that the POS terminal 5 is provided with. Note that while the functions that the POS terminal 5 is provided with are executed by the CPU 51 that is a general-purpose processor in the present embodiments and other later-described embodiments, part or all of these functions may be executed by one or a plurality of dedicated processors.

The identification information reading unit 61 reads user identification information presented by the user for point balance acquisition/notification/usage processing (first processing).

The first transmission unit 62 transmits the user identification information read by the identification information reading unit 61 to the point processing server (first processing server) 1 that performs point balance acquisition/notification/usage processing, regardless of whether this user identification information is point user identification information (first user identification information) for point balance acquisition/notification/usage processing (first processing), or settlement user identification information (second user identification information) for settlement processing (second processing).

In a case in which the user identification information read by the identification information reading unit 61 is settlement user identification information (second user identification information), the second transmission unit 63 transmits this settlement user identification information to the settlement processing server (second processing server) 3 that performs settlement processing (second processing) following point balance acquisition/notification/usage processing (first processing).

The point processing server 1 functions as an information processing device that is provided with a point user identification information generating unit (first generating unit) 21, a point user identification information storage unit (first storage unit) 22, an identification information receiving unit 23, a determining unit 24, a user identifying unit 25, a point processing unit (first processing unit) 26, and a point imparting unit (third processing unit) 27, by programs recorded in the storage device 14 being read to the RAM 13, and executed by the CPU 11, thereby controlling each of the pieces of hardware that the point processing server 1 is provided with. Note that while the functions that the point processing server 1 is provided with are executed by the CPU 11 that is a general-purpose processor in the present embodiments and other later-described embodiments, part or all of these functions may be executed by one or a plurality of dedicated processors.

The point user identification information generating unit (first generating unit) 21 generates point user identification information (first user identification information) for point balance acquisition/notification/usage processing (first processing) and/or point imparting processing (third processing) in response to a request from the user terminal 9. In the present embodiment, the point user identification information is identification information for access to an account of a user. Note that while description will be made regarding an example in which vendor user identification information, in which a different value is generated at each time of generating, and is invalidated under predetermined conditions, is used as the point user identification information in the present embodiment, other forms may be employed for the point user identification information. For example, the point user identification information may be fixed information, and not temporary. At this time, the fixed user identification information may be displayed in an application for point services, or may be recorded in a card medium.

The point user identification information storage unit (first storage unit) 22 stores the generated point user identification information (first user identification information) in association with the user of the user terminal 9.

The identification information receiving unit 23 receives user identification information presented by the user for point balance acquisition/notification/usage processing (first processing). Further, the identification information receiving unit 23 receives user identification information presented by the user for point balance acquisition/notification/usage processing or settlement processing following completion of settlement processing (second processing), in order to execute point imparting processing (third processing).

The determining unit 24 determines whether the received user identification information is point user identification information (first user identification information) for point balance acquisition/notification/usage processing (first processing) regarding the user, or settlement user identification information (second user identification information) for settlement processing (second processing) to be executed following the point balance acquisition/notification/usage processing.

In a case in which the received user identification information is determined to be settlement user identification information (second user identification information), the user identifying unit 25 identifies the user to be the object of the point balance acquisition/notification/usage processing (first processing) and/or the point imparting processing (third processing), by causing a settlement processing unit (second processing unit) 44 of the settlement processing server 3 to search a settlement user identification information storage unit (second storage unit) 42 using the received settlement user identification information.

The point processing unit (first processing unit) 26 performs point balance acquisition/notification/usage processing (first processing) for the user relating to the point user identification information (first user identification information) received by the identification information receiving unit 23 or the user identified by the user identifying unit 25. At this time, the point processing unit (first processing unit) 26 identifies the user to be the object of the point balance acquisition/notification/usage processing by searching the point user identification information storage unit (first storage unit) 22 using the point user identification information received by the identification information receiving unit 23.

The point imparting unit (third processing unit) 27 performs point imparting processing (third processing) executed following the settlement processing (second processing), for the user relating to the point user identification information (first user identification information) received by the identification information receiving unit 23 or the user identified by the user identifying unit 25.

The settlement processing server 3 functions as an information processing device that is provided with a settlement user identification information generating unit (second generating unit) 41, the settlement user identification information storage unit (second storage unit) 42, an instruction receiving unit 43, and the settlement processing unit (second processing unit) 44, by programs recorded in the storage device 34 being read to the RAM 33, and executed by the CPU 31, thereby controlling each of the pieces of hardware that the settlement processing server 3 is provided with. Note that while the functions that the settlement processing server 3 is provided with are executed by the CPU 31 that is a general-purpose processor in the present embodiments and other later-described embodiments, part or all of these functions may be executed by one or a plurality of dedicated processors.

The settlement user identification information generating unit (second generating unit) 41 generates settlement user identification information (second user identification information) for settlement processing (second processing) in response to a request from the user terminal 9. In the present embodiment, the settlement user identification information is identification information for access to settlement means of the user. Note that while description will be made regarding an example in which one-time user identification information, in which a different value is generated at each time of generating, and is invalidated when used once, is used as the settlement user identification information in the present embodiment, other forms may be employed for the settlement user identification information. For example, the settlement user identification information may be fixed information, and not variable. At this time, the fixed user identification information may be displayed in an application for settlement services, or may be recorded in a card medium.

The settlement user identification information storage unit (second storage unit) 42 stores the generated settlement user identification information (second user identification information) in association with the user of the user terminal 9.

The instruction receiving unit 43 receives an instruction to perform settlement processing (second processing) on the basis of the settlement user identification information (second user identification information).

In a case in which received user identification information is determined to be settlement user identification information (second user identification information), and an instruction to perform settlement processing (second processing) on the basis of the settlement user identification information is accepted, the settlement processing unit (second processing unit) 44 performs settlement processing on the basis of this settlement user identification information. At this time, the settlement processing unit (second processing unit) 44 identifies the user to be the object of settlement processing by searching the settlement user identification information storage unit (second storage unit) 42 using the settlement user identification information received by the identification information receiving unit 23.

Flow of Processing

Next, a flow of processing executed by the information processing system according to the present embodiment will be described. Note that the specific contents of processing and the order of processing described below are one example of carrying out the present disclosure. Specific processing contents and the order of processing may be selected as appropriate in accordance with the embodiment of the present disclosure.

FIGS. 4 through 7 are flowcharts and communication sequences showing the overview of a settlement flow according to the present embodiment. The processing shown in these flowcharts is executed, triggered by an operation for finalizing a settlement sum (e.g., pressing a "subtotal" button or the like) performed by a customer (user), following a barcode attached to a product or a service being scanned, or the price of a product/service being input by a salesclerk (operator), at the POS terminal 5.

In steps S101 through S107, the settlement sum for the user is finalized, and whether or not point services are to be used is determined. Upon accepting a settlement sum finalization operation by the operator, the POS terminal 5 finalizes the settlement sum for the user (step S101), and outputs an input accepting screen for the user to confirm whether or not to use point services (e.g., a screen for accepting instruction operations by the operator or user regarding whether or not to use, or a user identification information reading standby screen) (step S102). At this time, the operator queries the user regarding whether or not point services are to be used, and requests the user to present user identification information for using point services (point user identification information in the present embodiment). In a case in which the user desires to use point services, the user informs the operator to that effect, and presents a medium for reading user identification information (a user terminal on which a code is displayed, a card in which a code is printed, an RFID tag in which a code is recorded, etc.). The code that indicates the user identification information here may have a one-dimensional code (so-called barcode) or a two-dimensional code (so-called 2D barcode) format.

In the present embodiment, vendor user identification information generated by the point processing server 1 is used as the point user identification information. The point user identification information generating unit (first generating unit) 21 of the point processing server 1 receives, via the Internet, an issuance request for point user identification information that is transmitted by an application for point services running on the user terminal 9 such as a smartphone or the like that the user uses (step S103), and generates and issues the point user identification information for point processing (step S104). The point user identification information generated here is associated with a user ID and recorded at the point user identification information storage unit (first storage unit) 22 of the point processing server 1.

Note however, that there are cases in which the user presents user identification information other than point user identification information at this time. In the present embodiment, an example will be described in which the user presents user identification information for settlement processing, either knowing that the user identification information for settlement processing can also be used for point processing, or by mistake. In the present embodiment, one-time user identification information (user identification information that is usable only once, and is invalidated once the user identification information is used) generated by the settlement processing server 3 is used as the settlement user identification information. The settlement user identification information generating unit (second generating unit) 41 of the settlement processing server 3 receives, via the Internet, an issuance request for settlement user identification information that is transmitted by an application (may be implemented as the same application as the above-described application for point services) for settlement processing running on the user terminal 9 such as a smartphone or the like that the user uses (step S103), and generates and issues the settlement user identification information for settlement processing (step S105). The settlement user identification information generated here is associated with the user ID and recorded at the settlement user identification information storage unit (second storage unit) 42 of the settlement processing server 3.

Now, the user ID is an ID that is managed by a user management system (omitted from illustration) that is accessible from both the point processing server 1 and the settlement processing server 3. Accordingly, the point processing server 1 and the settlement processing server 3 can confirm the sameness of users to which different user identification information has been given, through the user ID managed by this user management system in the present embodiment.

Note that the application for point services and the application for settlement processing that are executed on the user terminal 9 may be implemented as a single application having the functions of both. Hereinafter these applications will be collectively referred to as "point/settlement processing application". The point/settlement processing application of the user terminal 9 receives the point user identification information or the settlement user identification information that is issued, and displays a code (one-dimensional/two-dimensional code) based on the received user identification information on the display of the user terminal 9 (step S106). The user presents the displayed code to the operator, and the operator uses the code reader of the POS terminal 5 to read the user identification information from the displayed code.

When an operation indicating that the user does not desire to use point services is received at the POS terminal 5 (NO in step S107), the processing relating to using point services is skipped, and the processing advances to step S123. Conversely, when the identification information reading unit 61 of the POS terminal 5 reads the user identification information by an operator operation (YES in step S107), the processing advances to step S109.

In steps S109 and S110, an inquiry request for point balance and accompanying user identification information are transmitted and received. When user identification information is read from the code that the user presents by operations of the operator, the first transmission unit 62 of the POS terminal 5 judges that the user desires to use the point services (YES in step S107), and transmits the user identification information read from the code (point user identification information or settlement user identification information in the present embodiment) to the point processing server 1 (step S109). The identification information receiving unit 23 of the point processing server 1 receives the user identification information transmitted from the POS terminal 5 (step S110). Thereafter, the processing advances to step S111.

In steps S111 through S116, in a case in which the received user identification information is settlement user identification information, the object user is identified on the basis of the settlement user identification information. The determining unit 24 determines whether the received user identification information is point user identification information or settlement user identification information (step S111). A method of determining whether point user identification information or settlement user identification information will be described later in description of FIG. 8. In a case in which determination is made that the received user identification information is point user identification information, the processing of steps S112 through S116 are skipped, and the processing advances to step S117.

Conversely, in a case in which determination is made that the received user identification information is settlement user identification information, the point processing server 1 is not able to identify the object user therein. Accordingly, the user identifying unit 25 of the point processing server 1 places a query regarding the object user by transmitting the settlement user identification information to the settlement processing server 3 (step S112). Upon receiving the query, the settlement processing unit (second processing unit) 44 of the settlement processing server 3 searches the settlement user identification information storage unit (second storage unit) 42 for the settlement user identification information generated and recorded in step S105 with the received settlement user identification information as a search key, thereby extracting the corresponding user ID (step S113), and replying to the point processing server 1 (step S114). The user identifying unit 25 of the point processing server 1 identifies the object user on the basis of the user ID received from the settlement processing server 3 (step S115). Once the object user is identified, the point user identification information generating unit (first generating unit) 21 of the point processing server 1 issues point user identification information for the object user, and replaces the settlement user identification information received from the POS terminal 5 with the point user identification information that is issued (step S116). Thereafter, the processing advances to step S117.

In steps S117 and S118, the point balance is acquired and notification thereof is made. The point processing unit (first processing unit) 26 of the point processing server 1 acquires the point balance of the object user account on the basis of the user ID or the point user identification information (step S117), and transmits the point user identification information of the object user and the point balance to the POS terminal 5 (step S118). The transmitted information is received by the POS terminal 5, and thereafter the processing advances to step S119.

In steps S119 through S122, points are used in accordance with a request from the user. The POS terminal 5 displays the point balance of the object user account received in step S118, and displays a screen for accepting an instruction regarding whether or not to apply all or part of these points to this settlement (step S119). In a case of accepting an instruction not to apply the points to the settlement (NO in step S120), point usage processing is skipped, and the processing advances to step S123. Conversely, in a case of accepting an instruction to use the points (apply to the settlement), and an instruction specifying the amount of points to be used (YES in step S120), the POS terminal 5 transmits the accepted point usage instruction and the amount of points to be used to the point processing server 1. The point processing server 1 receives the information transmitted from the POS terminal 5, and the point processing unit (first processing unit) 26 of the point processing server 1 updates the point balance by subtracting points of the specified amount from the point balance of the object user account. Upon confirming that usage of points has been accepted by the point processing server 1, the POS terminal 5 subtracts, from the settlement sum, an amount equivalent to the used points, thereby applying the points to part or all of the settlement, and changing the settlement sum (steps S121 and S122). Thereafter, the processing advances to step S123.

In steps S123 through S126, a settlement method is selected, and settlement processing is carried out in accordance with the selection. The POS terminal 5 displays a screen for accepting the settlement means desired by the user, and accepts selection of the settlement means (finalization operation by pressing a declaration key) (step S123). Now, in a case in which an instruction is accepted to use settlement means other than the settlement means by the settlement processing server 3, such as cash or the like (hereinafter referred to as "non-object settlement means"), the POS terminal 5 executes the settlement processing using the instructed settlement means (step S124), and completes the settlement (step S134). Detailed description of processing by the non-object settlement means will be omitted. Conversely, in a case in which an instruction is accepted to use settlement means according to the settlement processing server 3 (hereinafter referred to as "object settlement means"), the POS terminal 5 determines whether or not the user identification information read in step S107 is settlement user identification information (step S125). In a case of determination being made that the user identification information read in step S107 is settlement user identification information (YES in step S125), the processing advances to step S128.

Conversely, in a case of determination being made that the user identification information read in step S107 is not settlement user identification information (NO in step S125), settlement user identification information for the object settlement means is unacquired. Accordingly, the operator requests the user to present settlement user identification information (settlement user identification information in the present embodiment) for using the object settlement means, and the identification information reading unit 61 of the POS terminal 5 reads the settlement user identification information from the displayed code (step S126). Subsequently, the processing advances to step S128.

The flow of processing here in which the settlement processing server 3 that has accepted the request from the user terminal 9 to issue the settlement user identification information generates and issues the settlement user identification information, the user terminal 9 receives and displays the issued settlement user identification information, and the POS terminal 5 reads the settlement user identification information from the code, is substantially the same as the flow of processing in steps S105 through S107, and accordingly description will be omitted.

In steps S128 and S129, an instruction for settlement by the object settlement means is transmitted and received. In a case in which determination has been made in step S125 that the user identification information read in step S107 is settlement user identification information (YES in step S125), or in a case in which settlement user identification information is read in step S126, the second transmission unit 63 of the POS terminal 5 transmits an instruction for settlement processing by the object settlement means, and the settlement user identification information, to the settlement processing server 3 along with settlement information including the settlement sum (in a case in which points are used, the settlement sum following change) (step S128). That is to say, in the present embodiment, in a case in which the settlement user identification information was transmitted to the point processing server 1 in step S109, the POS terminal 5 transmits the same to the settlement processing server 3 as well following point processing, thereby reusing the settlement user identification information that was read once. Upon the instruction receiving unit 43 of the settlement processing server 3 receiving the instruction for settlement processing and the settlement user identification information and the settlement information, transmitted from the POS terminal 5 (step S129), the processing advances to step S131.

In steps S131 through S136, settlement of the settlement sum and recording of information are performed. The settlement processing unit (second processing unit) 44 of the settlement processing server 3 approves (authorizes) settlement (step S131) by confirming that the settlement user identification information transmitted from the POS terminal 5 and received matches settlement user identification information that was issued in the past at the settlement processing server 3 and currently is valid. Upon settlement being approved, the settlement processing unit (second processing unit) 44 performs settlement of the settlement sum regarding the instruction for settlement processing received in step S129 (step S132), and notifies the POS terminal 5 and the point/settlement processing application of the user terminal 9 of completion of settlement (step S133). The POS terminal 5 receives the notification of completion of settlement from the settlement processing server 3, and completes settlement (step S134).

Note that barcode settlement means encompassing server-type electronic money is employed in the present embodiment, and accordingly the settlement processing server 3 performs settlement by reducing the electronic money balance of the object user managed by this server by an amount equivalent to the settlement sum. Note however, that regarding specific contents of settlement processing carried out here, processing contents that are different depending on the settlement means may be employed, and the processing contents of the settlement processing are not limited to the example described in the present disclosure.

There conventionally is a method in which a mobile terminal or the like possessed by the user is used at the time of users performing settlement in brick-and-mortar stores. More specifically, there are methods in which a dedicated application is downloaded to the mobile terminal, a code displayed in this application is presented, and the stores side reads this code, thereby receiving settlement information, methods in which the user scans a code including an identifier indicating the shop, which is presented next to a cash register or the like, and the shop identifier that is read and information such as settlement monetary amount are sent together to a settlement server, and so forth. There also are services in which points are imparted at the time of settlement, in accordance with the settlement monetary amount, campaigns, and so forth.

However, in actual operations, the shop requires reading of a point card before settlement in almost all cases. The reason is that once the settlement operations on the POS terminal 5 (operation of inputting the deposited monetary amount) ends, the transaction is complete. Also, point processing includes not only processing for simply setting user identification information in transaction data, but also includes processing that needs to be performed before the transaction is completed, such as processing for using part of the current points for payment, calculation processing of points imparted for the purchase made this time, and so forth, for example.

According to the settlement flow described above, settlement can be realized by reusing the code presented by the user for imparting and applying points, without changing the current operation flow.

Once settlement is complete, the POS terminal 5 accumulates, in a point impartation file, the point user identification information and/or the settlement user identification information read from the user terminal 9 in this settlement, in association with the settlement sum of the object user (settlement sum following changing in a case in which points are used) and settlement date-and-time information (step S135). Now, a point impartation file is a file that is generated for each accumulation period set in advance, and is transmitted and subjected to batch processing once the accumulation period elapses. Note however, that the accumulation period and the batch processing cycle for point impartation files is not limited to the increment of one day that is exemplified in the present embodiment. Also, when settlement is complete, the settlement user identification information storage unit (second storage unit) 42 of the settlement processing server 3 stores the settlement user identification information used for settlement in a manner with the user ID of the object user, the settlement date-and-time, and the settlement monetary amount associated with each other (step S136). Thereafter, the processing shown in in this flowchart ends.

FIG. 8 is a diagram illustrating an overview of a point impartation file created in the present embodiment. User identification information, settlement date-and-time, and settlement monetary amount are recorded in an associated manner for each record No., in the point impartation file.

Note that while point user identification information and settlement user identification information are recorded coexisting in the point impartation file, point user identification information and settlement user identification information can be distinguished in accordance with a predetermined rule. For example, even if both the point user identification information and the settlement user identification information are 16-digit decimal representations, whether the user identification No. is for point processing or for settlement processing can be distinguished by setting in advance ranges of numerical values generated as user identification information, and distinguishing bits, between the point processing server 1 and the settlement processing server 3 and referencing these. Note that in the present embodiment, point user identification information has a 16-digit decimal representation that starts from "1111", and settlement user identification information has a 16-digit decimal representation that starts from "1212". Accordingly, processing entities in the present system, such as the point processing server 1, the settlement processing server 3, the POS terminal 5, and so forth, can distinguish whether this user identification No. is for point processing or for settlement processing by referencing the first four digits of the user identification No.

FIG. 9 is a diagram illustrating an overview of data stored in the settlement user identification information storage unit (second storage unit) 42 of the settlement processing server 3 in the present embodiment. The settlement user identification information storage unit 42 stores, in each record No., settlement user identification information starting from "1212", user ID, settlement date-and-time, and settlement monetary amount, in an associated manner.

Figure 10:
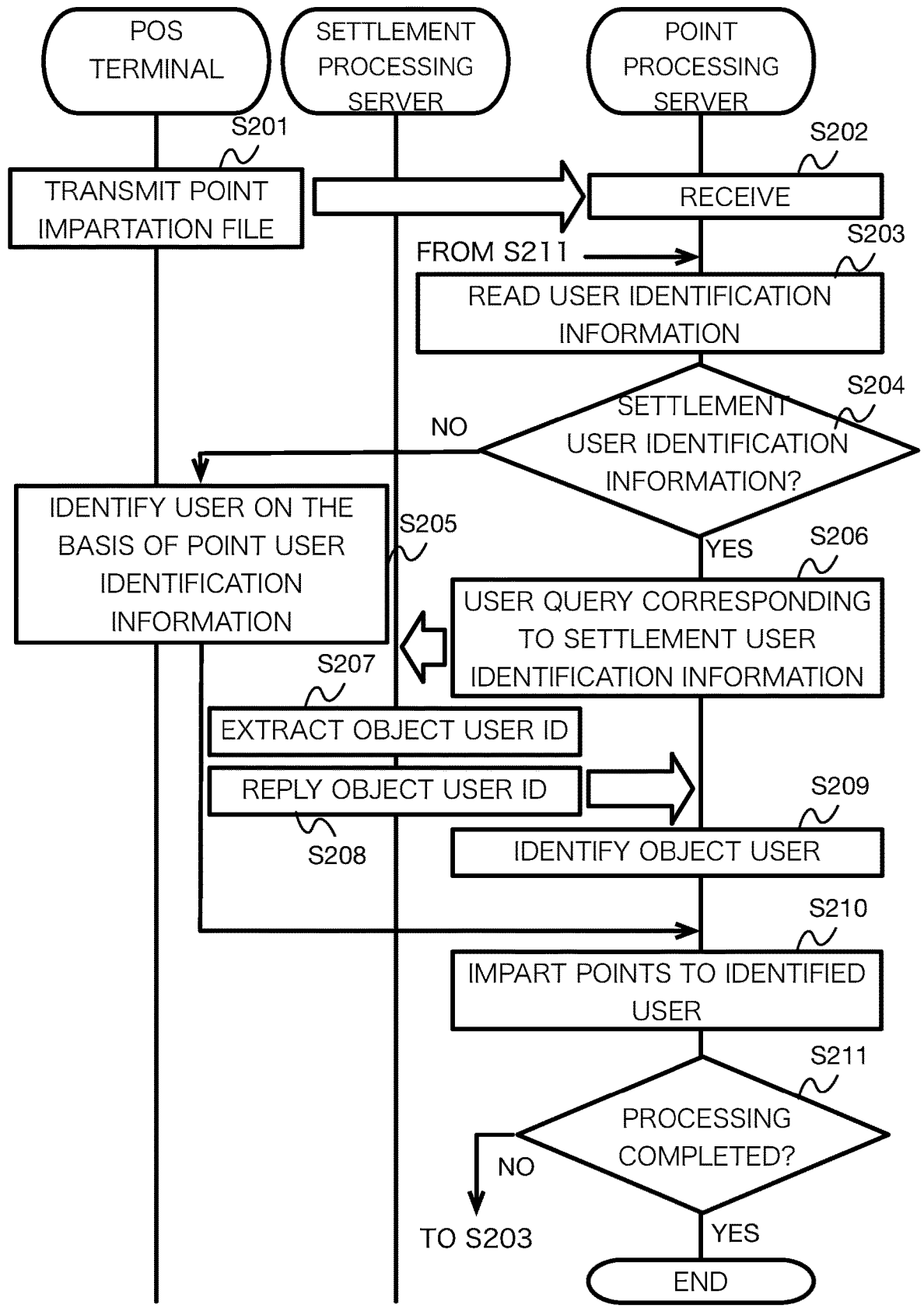
FIG. 10 is a flowchart and communication sequence showing an overview of a point impartation flow according to the embodiment.

FIG. 10 is a flowchart and communication sequence illustrating an overview of a point impartation flow according to the present embodiment. The processing illustrated in this flowchart is batch processing executed every predetermined amount of time set in advance (e.g., each day). Note however, the accumulation period of point impartation files and the batch processing cycle are not limited to the increment of one day exemplified in the present embodiment. For example, the pint impartation flow may be executed with a predetermined number of records being accumulated in the point impartation file as a trigger.

In steps S201 and S202, the point impartation file is transmitted and received. The POS terminal 5 transmits the point impartation file in which information has accumulated over the predetermined period (one day in the example of the present embodiment) to the point processing server 1 (step S201), and the identification information receiving unit 23 of the point processing server 1 receives the point impartation file transmitted from the POS terminal 5 (step S202). Thereafter the processing advances to step S203.

In steps S203 and S204, the type of user identification information within the point impartation file is determined. As described above, the point impartation file has accumulated within the point user identification information and/or settlement user identification information read from the user terminal 9 during settlement, associated with the settlement sum of the object user (the settlement sum following changing in a case of using points) and the settlement date-and-time information. Accordingly, the determining unit 24 of the point processing server 1 that receives the point impartation file reads out unprocessed user identification information accumulated in the point impartation file (step S203), and determines whether the user identification information that has been read is point user identification information or settlement user identification information (step S204). The specific method of determination is as described with reference to FIG. 8, and accordingly description will be omitted. In a case of determining here that the user identification information that has been read is point user identification information, the processing advances to step S205. Conversely, in a case of determining that the user identification information that has been read is settlement user identification information, the processing advances to step S206.

In step S205, the user is identified on the basis of the user identification information for point processing. In a case in which the user identification information is determined to be point user identification information, the point imparting unit (third processing unit) 27 of the point processing server 1 searches the point user identification information storage unit (first storage unit) 22 generated and recorded in step S104 of the settlement flow with the user identification information that has been read as a search key, thereby extracting the corresponding user ID, and identifying the user to whom points are imparted. Thereafter, the processing advances to step S210.

In steps S206 through S209, the user is identified on the bases of user identification information for settlement processing. In a case in which the user identification information is determined to be settlement user identification information, the user identifying unit 25 of the point processing server 1 transmits this settlement user identification information to the settlement processing server 3, thereby placing a query regarding the object user (step S206). Upon receiving the query, the settlement processing unit (second processing unit) 44 of the settlement processing server 3 searches the settlement user identification information storage unit (second storage unit) 42 recorded in the settlement flow, with the received settlement user identification information as a search key, thereby extracting the corresponding user ID (step S207), and replying to the point processing server 1 (step S208). The user identifying unit 25 of the point processing server 1 identifies the user to whom points are to be imparted on the basis of the user ID replied from the settlement processing server 3 (step S209). Thereafter, the processing advances to step S210.

In step S210, points are imparted to the identified user. The point imparting unit (third processing unit) 27 of the point processing server 1 adds points calculated in accordance with the settlement sum (e.g., points of 1% of the settlement sum), or predetermined points set in advance for a campaign or the like, to the point balance of the user account identified on the basis of the obtained user ID. Thereafter, the processing advances to step S211.

In step S211, confirmation is made regarding whether or not processing has been completed for all user identification information included in the point impartation file. The point processing server 1 confirms whether processing of steps S203 through S210 has been completed for all user identification information included in the point impartation file that is received. In a case in which there remains unprocessed user identification information in the point impartation file, the processing advances to step S203. That is to say, the processing shown in this flowchart is repeatedly executed until processing of all user identification information included in the point impartation file is completed. Conversely, in a case in which no unprocessed user identification information remains in the point impartation file, i.e., in a case in which processing is completed for all user identification information included in the point impartation file, the processing shown in this flowchart ends.

As described above, there conventionally are services for imparting points in accordance with settlement monetary amounts, campaigns, and so forth, at the time of settlement.

However, codes used for performing settlement and codes used for imparting points exist independent from each other. Accordingly, the users need to present a plurality of codes to the store for settlement and point impartation, which is troublesome. Also, it is not clear to some users that these codes are separate, and accordingly opportunities of acquiring points have been lost in some cases.

According to the point impartation flow described above, a framework can be realized in which points are also imparted using the code presented by the user at the time of settlement, even in cases in which only user identification information for settlement processing is acquired, such as in cases in which the user does not desire to use point services (NO in step S107), and only uses object settlement means (selecting the object settlement means in step S123), in the settlement flow shown in FIGS. 4 through 7. Also, the point impartation flow described above is not limited to a system employing the settlement flow according to the present embodiment, shown in FIGS. 4 through 7, and is applicable to conventional systems in which point processing using user identification information for settlement processing is not performed.

Variations

An example has been described in the above embodiment in which an instruction for settlement is transmitted to the settlement processing server 3 (step S128) upon selection of settlement means (a finalization operation by pressing a declaration key) being performed (step S123). However, instruction of settlement to the settlement processing server 3 may be omitted in a case in which the POS terminal 5 is able to confirm by automatic determination that the user identification information that has been read in step S107 is settlement user identification information. Thus, the trouble for the user and the operator in the point processing and the settlement processing can be further reduced.

Also, although one-dimensional/two-dimensional code and an optical code reader has been primarily described in the above embodiment as means for acquiring user identification information, means other than those described in the present embodiment (e.g., RFID and integrated circuit (IC) reader, text string and optical character recognition (OCR), and so forth) may be employed as the acquisition means of the user identification information.

What is claimed is:

1. An information processing system, comprising:
   a memory; and
   a processor coupled to the memory, the processor being configured to read and operate according to computer program code stored in the memory, the computer program code being configured to cause the processor to execute:
      receiving user identification information corresponding to a user based on information read using a user terminal;
      determining whether the user identification information that has been received is first user identification information for performing first processing relating to the user, or second user identification information for performing second processing that is executed following the first processing, wherein the first user identification information is different than the second user identification information, and the second processing comprises settlement processing;
      identifying, in a case of determining that the user identification information that has been received is the second user identification information, a first user identification information relating to the user, on the basis of the second user identification information, wherein the identifying comprises transmitting the second user identification information to an external server which performs the second processing, and receiving the first user identification information relating to the user from the external server;
      performing, in the case of determining that the user identification information that has been received is the second user identification information, the first processing based on the first user identification information identified on the basis of the second user identification information; and
      performing third processing following the second processing,
   wherein the first processing comprises applying points associated with an account of the user to an amount subjected to the settlement processing to reduce the amount subjected to the settlement processing,
   wherein the third processing is processing for modifying a balance associated with the acount of the user and comprises adding points to the account in accordance with the amount subjected to the settlement processing,
   wherein the third processing is performed based on the first user identification inforamtion in a case of determining that the user identification information that has been received is the first user identification information,
   wherein the third processing is performed based on the first user identification information identified on the basis of the second user identification information in the case of determining that the user identification information that has been received is the second user identification information,
   wherein, in the case of determining that the user identification information that has been received is the second user identification information, the second processing is performed by the reusing the second user identification information, thereby allowing both the first processing and the second processing to be performed without requiring the first user identification information to be obtained using the user terminal, and reducing trouble of the first processing and the second processing,
   wherein the first processing and the third processing are executed by a point processing server or a point processor, and
   wherein the second processing is executed by an external settlement server.

2. The information processing system according to claim 1, wherein the computer program code is further configured to cause the processor to execute:
   generating first user identification information for the first processing in response to a request from a user terminal;
   storing the first user identification information that has been generated, in association with the user of the user terminal in the memory; and
   identifying a user that is an object of the first processing, by searching the memory by using the first user identification information that has been received by the processor, and performing the first processing.

3. The information processing system according to claim 1, wherein the computer program code is further configured to cause the processor to execute:
   generating second user identification information for the second processing in response to a request from a user terminal;

storing the second user identification information that has been generated, in association with the user of the user terminal in the memory; and identifying a user that is an object of the second processing, by searching the memory by using the second user identification information that has been received by the processor, and performing the second processing.

4. The information processing system according to claim 3, wherein the computer program code is further configured to cause the processor to identify a user that is an object of the third processing, by causing the processor to search the memory by using the second user identification information that has been received.

5. The information processing system according to claim 1, wherein the second user identification information is identification information for accessing settlement resources of the user, and the first user identification information is identification information for accessing the account of the user.

6. The information processing system according to claim 5, wherein the first processing comprises any one or any combination of:

processing of acquiring a usable balance of points associated with the account of the user, and processing of notifying a transmission source of the user identification information, of the usable balance.

7. A method executed by a computer, the method comprising:

receiving user identification information corresponding to a user based on information read using a user terminal;

determining whether the user identification information that has been received is first user identification information for performing first processing relating to the user, or second user identification information for performing second processing that is executed following the first processing, wherein the first user identification information is different than the second user identification information, and the second processing comprises settlement processing;

identifying, in a case of determining that the user identification information that has been received is the second user identification information, the first user identification information relating to the user, on the bases of the second user identification information, wherein the identifying comprises transmitting the second user identification information to an external server which performs the second processing, and receiving the first user identification information relating to the user from the external server;

performing, in the case of determining that the user identification information that has been received is the second user identification information, the first processing based on the first user identification information identified on the basis of the second user identification information; and performing third processing following the second processing, wherein the first processing comprises applying points associated with an account of the user to an amount subjected to the settlement processing to reduce the amount subjected to the settlement processing, wherein the third processing is processing for modifying a balance associated with the account of the user and comprises adding points to the account in accordance with the amount subjected to the settlement processing, wherein the third processing is performed based on the first user identification information in a case of determining that the user identification information that has been received is the first user identification information, wherein the third processing is performed based on the first user identification information identified on the bases of the second user identification information in the case of determing that the user identification information that has been received is the second user identification information, wherein, in the case of determining that the user identification information that has been received is the second user identification information, the second processing is performed by resuing the second user identification information, thereby allowing both the first processing and the second processing to be performed without requiring the first user identification information to be obtained using the user terminal, and reducing trouble of the first processing and the second processing, wherein the first processing and the third processing are executed by a point processing server or a point processor, and wherein the second processing is executed by an external settlement server.

8. A non-transitory computer-readable recording medium having recorded thereon a program, causing a computer to execute:

receiving user identification information corresponding to a user based on information read using a user terminal;

determining whether the user identification information that has been received is first user identification information for performing first processing relating to the user, or second user identification information for performing second processing that is executed following the first processing, wherein the first user identification information is different than the second user identification information, and the second processing comprises settlement processing;

identifying, in a case of determining that the user identification information that has been received is the second user identification information, the first user identification information relating to the user, with the third processing being executed following the second processing, on the basis of the second user identification information, wherein the identifying comprises transmitting the second user identification information to an external server which performs the second processing, and receiving the first user identification information relating to the user from the external server;

performing, in the case of determining that the user identification information that has been received is the second user identification information, the first processing based on the first user identification information identified on the bases of the second user identification information; and performing third processing following the second processing, wherein the first processing comprises applying points associated with an account of the user to an amount subjected to the settlement processing to reduce the amount subjected to the settlement processing, wherein the third processing is processing for modifying a balance associated with the account of the user and comprises adding points to the account in accordance with the amount subjected to the settlement processing, wherein the third processing is performed based on the first user identification information in a case of determining that the user identification information that has been received is the first user identification information, wherein the third processing is performed based on the first user identification information identified on the basis of the second user identification information in the case of determining that the user identification information that has been received is the second user identification information, wherein, in the case of determining that the user identification information that has been received is the second user indentification information, the second processing is performed by reusing the second user identification information, thereby allowing both the first processing and the second processing to be performed without requiring the first user identification information to be obtained using the user terminal, and reducing trouble of the first processing and the second processing, wherein the first processing and the third processing are executed by a point processing server or a point processor, and wherein the second processing is executed by an external settlement server.

9. The information processing system according to claim 1, wherein the user identification information corresponding to the user is acquired using a code reader.

10. The information processing system according to claim 9, wherein the code reader comprises a radio-frequency identification (RFID) reader.

11. The information processing system according to claim 9, wherein the code reader comprises an optical code reader.

12. The information processing system according to claim 1, wherein
the second user identification information is identification information for accessing settlement means of the user, and
the first user identification information is identification information for accessing the account of the user.

13. The information processing system according to claim 1, wherein
the user identification information comprises a plurality of first bits and a plurality of second bits, and
the determining whether the user identification information is the first user identification information or the second user identification information comprises comparing the plurality of first bits with a first decimal representation corresponding to the first user identification information and a second decimal representation corresponding to the second user identification information.

* * * * *